Patented July 5, 1949

2,475,005

UNITED STATES PATENT OFFICE 2,475,005

ONIUM-CATALYZED PHENOLIC RESINS

James L. Brannon, Plainfield, N. J., assignor to Bakelite Corporation, a corporation of New Jersey No Drawing. Application November 23, 1945, Serial No. 630,567

19 Claims. (Cl. 260—57)

This invention relates to the preparation of phenolic resins by which is meant resins prepared from phenols and aldehydes usually formaldehyde. This application is a continuation-in-part of a copending application Serial No. 382,345, filed March 8, 1941, now abandoned, for phenolic resins.

In Patent No. 2,234,548, granted March 11, 1941, there is described the preparation of phenol-formaldehyde condensation products in the presence of an organic base of the onium type or the phenolic salt thereof. The bases therein set forth are those of the pentavalent and tetravalent onium compounds such as the quaternary ammonium, phosphonium, arsonium, stibonium or sulphonium hydroxides, wherein no hydrogen atoms remain attached to the nitrogen, phosphorus, arsenic, antimony or sulfur atom as the case may be and wherein the groups substituted for hydrogen are the alkyl, aryl or aralkyl groups. Resins so made are characterized by improved water and solvent resistance without sacrifice of strength, transparency, freedom from color and easy machinability in the cast form.

The present invention is based on the discovery that onium compounds with substituents for hydrogen atoms of the groups specified in the foregoing patent give equivalent resins and in some cases resins with improved properties. In general they are bases of penta and tetravalent onium compounds which can be described by the structural formula

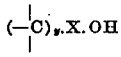

wherein X represents the characterizing atom of the onium compound-pentavalent nitrogen, phosphorus, arsenic, antimony and tetravalent sulfur-, $y$ is a number equal to the valency of the characterization minus 1 and C represents a carbon atom of a hydrocarbon radical in the structure in which at least one of the radicals has at least one hydrogen atom replaced by either chlorine, a hydroxy (including aroxy or alkoxy) radical or a carboxy radical. These onium bases are strongly alkaline and comparable with sodium hydroxide in this respect; they do not form addition products with formaldehyde.

Of these onium compounds the alkylol onium hydroxides have been found particularly effective; the alkylol ammonium hydroxides, for instance, offer advantages over quaternary ammonium hydroxides having the hydrogens attached to the characterizing atom replaced by hydrocarbon radicals. They are more easily prepared; as an example trimethyl alkylol ammonium hydroxides can be made simply by adding an alkylene oxide to an aqueous solution of trimethylamine and the reaction proceeds rapidly without any special care to yield a completely colorless product. Again cast resins made in the presence of trimethyl propanol ammonium hydroxide are more transparent and considerably stronger than those reacted in the presence of onium bases substituted with the hydrocarbon radicals, while they are equally as good in water and light resistance and machinability. The alkylol ammonium hydroxides also have an improved plasticizing action and give resins of reduced viscosity. The mere changing of the groups substituted in the onium compounds therefore makes it possible to materially modify the properties of the resins made with them.

The changes in properties of the resin so obtained do not require any appreciable modification of the resin preparation. In general about one mol of a phenol is reacted with from one to three mols of aqueous formaldehyde in the presence of an onium base (or phenolic salt) at any convenient temperature ranging from 50° C. to 100° C. Upon completion of the condensation, the reaction mass can then be acidified with either an organic or inorganic acid, and the water removed by distillation. For certain applications, such as a binding agent in grinding wheels, it may be desirable to leave the resin in its unneutralized form and to remove only a part of the water; for other applications, such as an impregnant or coating for paper, the resin may be acidified but part of the water retained.

Peculiar to these resins, moreover, is that almost any acid can be used for neutralization without destroying the transparency of the final product. With the hitherto used strongly alkaline catalysts, the neutralizing acids have been limited to a very few when transparent cast resins have been the object. To illustrate, where citric acid is used to neutralize sodium hydroxide, crystals of sodium citrate are produced which tend to form spots; with the onium base catalysts, no such result follows, and citric acid is desirable on account of its bleaching action.

A feature which distinguishes the resin-making procedure using the onium bases of this invention from that utilizing strong alkaline catalysts, such as sodium hydroxide, is that phase separation occurs much more readily. This offers a precise means of controlling the reaction to obtain a high degree of uniformity from batch to batch. The reaction can be continued until a sample from a batch shows phase separation when cooled to a definite temperature or when a few cc. of water are added to a measured sample of the resin; as the reaction is continued, the temperature at which phase separation occurs gradually increases or the amount of water required to cause phase separation at any one temperature gradually decreases.

In addition to the combination of water and solvent resistance with strength, transparency, etc., the resins obtained are notable for their good wetting properties and their solvent action on cellulose. The resins, therefore, are desirable for filled materials and particularly for those requiring impregnation of cellulose fibers for securing translucency. Laminated cellulosic sheets so made are accordingly characterized by improved translucency and gloss, and the wetting property of the resin also minimizes the likelihood of spots due to a lack of sufficient penetration of the paper or cellulosic sheet at those points.

In illustration of the invention the following examples are given.

*Example 1.*—Trimethyl isopropanol ammonium hydroxide was prepared by charging 236 parts by weight of a 25 per cent aqueous solution of trimethylamine into a closed vessel and cooling to 10° C. Sixty parts of propylene oxide was cooled to 0° C. and rapidly added with stirring into the amine solution; the system was kept closed during the addition to prevent loss of reactants, but this is not necessary. The temperature rose sharply to about 50° C. whereupon the mass was cooled to room temperature (25° C.) and stored in containers; the sharp temperature rise can be avoided by slow addition, and the rate of addition is not important. The product was a 45 per cent solution of trimethyl isopropanol ammonium hydroxide. Its structural formula is:

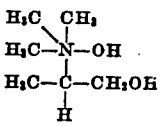

The method used can be followed in making other alkylol quaternary ammonium bases. Triethyl ethanol ammonium hydroxide can be made by adding ethylene oxide to an aqueous solution of triethylamine. Tetraethanol ammonium hydroxide results from adding ethylene oxide to triethanolamine. Similarly trimethyl isopropanol arsonium hydroxide is obtained from propylene oxide and trimethyl arsine. The alkylol phosphonium, stibonium and sulfonium derivatives are made by the same procedure.

For preparing a resin, 500 grams of phenol, 1000 grams of 37 per cent aqueous formaldehyde and 70.5 grams (.235 gram-mol equivalents) of a 45 per cent aqueous solution of trimethyl propanol ammonium hydroxide were heated together at a temperature of 80° C. for 3 hours or until phase separation occurred when cooled to 12° C. With these proportions the pH of the mass was 8.4; the pH can range from 7.8 to 8.8 but with the increase in catalyst better results follow. The resinous condensation product so formed was acidified with 38 grams of crystalline citric acid and plasticized with 40 grams of diethylene glycol; this changed the pH to about 4.4. The water was then removed by heating under a vacuum of 30 mm. until the temperature of the resin had risen to 90° C., giving a practically water-free but a thin readily-pourable resin at this temperature.

When the resin was poured into molds and cured at 90° C. for 30 hours, a solid product was obtained which was light in color and transparent. It was tough and could be baked without loss of transparency to a constant Brinell hardness. The hardened cast product was transparent in sections 10 inches thick and had unusually good water and solvent resistance, light resistance, strength and machinability.

The resin of this example was used in making translucent laminated material by impregnating a good grade of white rag paper with a solution of the resin in alcohol or alcohol and water containing about 50 per cent solids. The solution was applied by roller-coating; knife-coating can be used as well. The paper was dried at 180° to 240° F. and contained from 55 to 65 per cent of resin. The desired number of sheets were stacked and submitted to 1000 pounds per square inch pressure for about 30 minutes at a temperature of about 225°–250° F.; the low temperature insured the absence of any coloration. The laminated product had improved translucency and resistance to water. Release agents, such as Wetanol and Aerosol are helpful, and can be included in amount of about one per cent of the weight of the resin; the compositions of these agents are given in a list appearing in Industrial and Engineering Chemistry, volume 35, page 126, the "Aerosols" being sodium sulfonate esters and "Wetanol" being sodium salts of sulfated fatty alcohols.

*Example 2.*—As representative of replacement of a hydrogen by a halogen the catalyst selected was trimethyl chloroethyl ammonium phenolate. It has the structural formula:

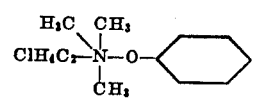

A resinous condensation product was made by heating together 367 grams of phenol, 1000 grams of 37 per cent aqueous formaldehyde and 179 grams (.235 gram-mol equivalents) of a phenol solution of trimethyl chloro-ethyl ammonium phenolate at a temperature of 80° C. under reduced pressure for 3 hours. At the end of this time the addition of one part of water to two parts of the reaction mass caused separation into two phases at 23° C. The product was acidified with 24 grams of crystalline tartaric acid and plasticized with 40 grams of glycerine. Water was then removed by heating under a 30 mm. vacuum until the temperature rose to 100° C. The product was a thin pourable resin which could be processed and utilized as in Example 1. Its transparency was not quite as good as the product of the previous example.

*Example 3.*—Trimethyl tetramethyl-ammonium-aceto ammonium hydroxide was used as a condensation catalyst; its structural formula is:

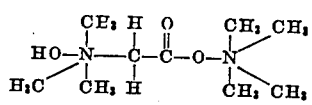

Two hundred grams of this base in aqueous solution was added to 500 grams of phenol and 1000 grams of 37 per cent aqueous formaldehyde, and the mass was heated at a temperature of 80° C. for 3 hours. The condensation product was acidified with 38 grams of citric acid and plasticized with 40 grams of ethylene glycol. It was then dehydrated as in Example 1. When poured into molds and cured at 90° C. for 36 hours, the product was transparent, strong and had good machining properties.

*Example 4.*—The hydroxide-O, O', p, trimethyl phenol tridimethyl isopropanol ammonium hydroxide was made by the following reaction:

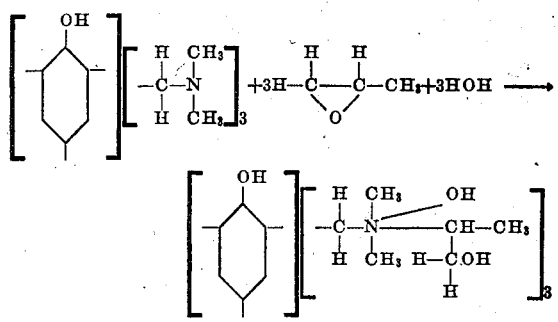

This was used as a catalyst by adding a water solution of 81 grams (.235 gram-mol equivalents) to 500 grams of phenol and 1000 grams of 37 per cent aqueous formaldehyde and heating at 80° C. for 5 hours. The resin was unusually low in viscosity when acidified and dehydrated as in Example 1. When the acidified and dehydrated resin was cast into molds and cured at 90° C., the product had a very high degree of transparency and toughness.

*Example 5.*—Five hundred grams of phenol, 1000 grams of 37 per cent aqueous formaldehyde and 35 grams (.117 gram-mol equivalents) of an aqueous solution of trimethyl isopropanol ammonium hydroxide were reacted by refluxing at 100° C. until phase separation occurred at 40° C. The water was partially removed by decantation after cooling and settling and the remainder removed by distillation. The resin was acidified before (or after) water removal by adding 20 grams of crystalline citric acid. After the removal of the water from the acidified mass, there remained a thin pourable resin which was readily cast and hardened at 90° C. for 30 hours. The product was strong, light in color and transparent. In suitable solvents (alcohol or acetone) it was used advantageously for paper sizing or impregnation.

*Example 6.*—Trimethyl ethanol ammonium hydroxide

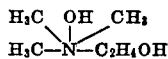

was added in the amount of 65 grams (.235 gram-mol equivalents) to 500 grams of phenol and 1000 grams of 37 per cent aqueous formaldehyde and reacted at 80° C. until phase separation occurred at 25° C. The resin was neutralized with 38 grams of citric acid and dehydrated to 90° C. as in Example 1. The product was satisfactory for casting and impregnating of paper and in the unneutralized form for the manufacture of abrasive wheels.

*Example 7.*—A resin was made as in Example 1 except that acidification was brought about by the addition of 28 grams of 85 per cent phosphoric acid or until a pH of 4.5 was obtained. The product was similar to that of Example 1 and useful for the same applications. Other acids can be substituted as hydrochloric, oxalic (17 grams) tartaric (24 grams) and 50 per cent lactic (52 grams).

*Example 8.*—Benzyl triethanol ammonium hydroxide was prepared by reacting triethanolamine and benzyl chloride in acetone at room temperature and then converting the quaternary ammonium so produced to the hydroxide by reacting with silver oxide and filtering out the silver chloride. The structural formula is:

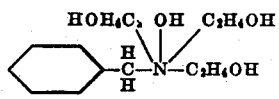

One hundred and twenty-two grams of a 50 per cent solution of this base was added to a mixture of 500 grams of phenol and 1000 grams of 37 per cent formaldehyde solution, and the mass was reacted at 100° C. under reflux for 3 hours. The material was then acidified with 210 cc. of 1 N hydrochloric acid and 7.5 grams of 50 per cent lactic acid. It was dehydrated as in Example 1 without addition of plasticizer, cast into molds and baked at 90° C. for 60 hours. The baked product was transparent, soft and rubber-like. In this instance the high plasticizing effect of the onium base used brought about an unusual flexibility and softness. This illustrates the plasticizing effect obtained by having hydroxyl groups in the radicals of the onium compounds.

*Example 9.*—A resin was made as in Example 1 with the exception that an equivalent amount of trimethyl ethanol arsonium hydroxide was used as the onium base catalyst with the structural formula:

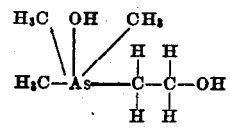

The resin was identical with that of Example 1 except that it had a tendency to be somewhat darker in color; this, however, might be caused by a slight difference in impurities present. When cured at 90° C. for 30 hours the product was like that of Example 1 with the exception of color.

*Example 10.*—A resin was made as in Example 1 but having as a catalyst trimethyl isopropanol phosphonium hydroxide in equivalent amount. The resin was like that of Example 1 in all respects except that it was somewhat darker. The formula for the hydroxide is:

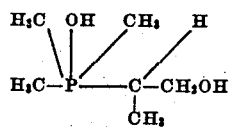

*Example 11.*—A resin was made as in Example 1 but having as a catalyst trimethyl isopropanol stibonium hydroxide obtained by the procedure explained in that example. The resin was comparable to that of Example 10.

*Example 12.*—One thousand grams of phenol and 800 parts of 37 per cent aqueous formaldehyde and 30 grams of 25 per cent aqueous solution of trimethyl isopropanol ammonium hydroxide were refluxed at 100° C. until phase separation occurred or at the end of about 3 hours, 500 grams of distilled water were added and the mixture allowed to cool and settle for 6 hours. The supernatant aqueous layer was removed, and 10 grams of lactic acid (50 per cent) were added to the resinous layer which was then heated under 25 mm. vacuum to a temperature of 95° C. The resin was cast and hardened at 130° C. under 100 pounds per square inch pressure for 18 hours. The product was hard, transparent and easily machinable. It was boiled in water for 24 hours without being harmed.

*Example 13.*—Five hundred grams of phenol, 1000 grams of 37 per cent aqueous formaldehyde and 100 grams of a 40 per cent solution of diethyl beta-hydroxy-propyl sulphonium hydroxide were mixed and heated to 82° C. for 3 hours. The condensation product was heated under reduced pressure of 30 mm. absolute pressure to a temperature of 50° C. Seventy-five grams of 50 per cent citric acid solution and 50 grams of diethylene glycol were then added and the heating continued under 30 mm. absolute pressure to a temperature of 100° C. The product was a clear thin resin soluble in acetone or alcohol and useful as a paper size or laminating varnish. For casting, the resin was maintained at 100° C. under 30 mm. absolute with agitation until a 125 gram sample dissolved in 35 grams of denatured ethyl alcohol showed a viscosity of about 120 c. p. at 50° C.; it was then cast and baked at 85° C. for about 40 hours or until the desired degree of hardness was reached.

The diethyl beta-hydroxy-propyl sulphonium hydroxide can be made by reacting ethyl sulphide with iodoisopropyl alcohol as shown by the following formula:

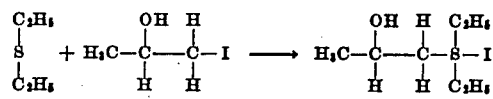

The iodide salt is then reacted with silver oxide in finely divided form and the silver iodide removed by filtering through a glass fiber filter. The aqueous solution contains the sulphonium hydroxide. The solution can be concentrated by distilling off water under reduced pressure.

In the foregoing description formaldehyde is specified as the methylene-containing substance for reaction with the phenol; equivalents or compounds engendering formaldehyde as paraform can be substituted. Likewise in place of phenol the alkyl- and aryl-substituted phenols and phenolic bodies generally can be used. The bases are collectively referred to as catalysts, following the usage in the synthetic resin art; but they react with the phenolic ingredient, and it is to be understood that within the scope of the term "base" or "basic derivative" is included the phenate of the base. In general the amount of base included in the reaction mass is such as to give a pH range of from about 7.8 to 8.8.

The resins are useful as agents for addition to other types of resin, particularly the customary phenolic resins in which they are very soluble, to impart improved toughness, machinability, etc. to them.

What is claimed is:

1. Process of preparing a resinous product which comprises reacting formaldehyde and a phenol in the presence of a basic derivative of an onium compound having the structural formula

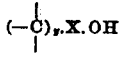

wherein X represents the characterizing atom of the onium compound and selected from the group consisting of nitrogen, phosphorus, arsenic, antimony and sulfur, $y$ is a number equal to the valency of the characterizing atom minus 1, and C represents a carbon atom of a hydrocarbon radical in the structure in which at least one of the radicals has one hydrogen atom replaced by a member of the group consisting of chlorine, hydroxy radicals and substituted carboxy radicals.

2. Process according to claim 1 in which the basic derivative is included in amount to give a pH ranging from 7.8 to 8.8.

3. Process according to claim 1 in which the basic derivative is an ammonium compound.

4. Process according to claim 1 in which the basic derivative is an alkylol onium hydroxide.

5. Process according to claim 1 in which the basic derivative is an alkylol ammonium hydroxide.

6. Process according to claim 1 in which the basic derivative is trimethyl isopropanol ammonium hydroxide.

7. Process according to claim 1 in which the resin reaction is continued until phase separation occurs in a cooled sample extracted from the mass.

8. Process according to claim 1 in which the resin reaction is continued until phase separation occurs in a cooled sample extracted from the mass upon the addition of water.

9. Process according to claim 1 in which the resin is acidified and dehydrated.

10. Process according to claim 1 in which the resin is acidified and dehydrated, casting the resin into molds and heat-hardening the cast product by baking.

11. Process according to claim 1 in which the resin is acidified, applying the resin in solution to a sheet material, drying the material and subjecting the material to hot-pressing.

12. Resinous reaction product of formaldehyde and a phenol in the presence of a basic derivative of an onium compound having the structural formula

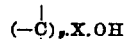

wherein X represents the characterizing atom of the onium compound selected from the group consisting of nitrogen, phosphorus, arsenic, antimony and sulfur, $y$ is a number equal to the valency of the characterizing atom minus 1, and C is a carbon atom in a hydrocarbon radical with one of the valencies of one of the carbon atoms satisfied by the replacement of a hydrogen atom by a member of the group consisting of chlorine, hydroxy radicals and substituted carboxy radicals.

13. Product according to claim 12 in which the basic derivative is included in amount to give a pH ranging from 7.8 to 8.8.

14. Product according to claim 12 in which the basic derivative is an ammonium compound.

15. Product according to claim 12 in which the basic derivative is an alkylol onium hydroxide.

16. Product according to claim 12 in which the basic derivative is an alkylol ammonium hydroxide.

17. Product according to claim 12 in which the basic derivative is trimethyl isopropanol ammonium hydroxide.

18. Product according to claim 12 in acidified and dehydrated form.

19. Product according to claim 12 incorporated with a sheet material.

JAMES L. BRANNON.

No references cited.